No. 740,065. PATENTED SEPT. 29, 1903.
B. VESSELS.
CHURN.
APPLICATION FILED JUNE 2, 1903.
NO MODEL.

Witnesses
E. F. Stewart
C. N. Woodward

Benjamin Vessels, Inventor,
by C. A. Snow & Co
Attorneys

No. 740,065. Patented September 29, 1903.

UNITED STATES PATENT OFFICE.

BENJAMIN VESSELS, OF RAIZON, MISSOURI.

CHURN.

SPECIFICATION forming part of Letters Patent No. 740,065, dated September 29, 1903.

Application filed June 2, 1903. Serial No. 159,771. (No model.)

*To all whom it may concern:*

Be it known that I, BENJAMIN VESSELS, a citizen of the United States, residing at Raizon, in the county of Perry and State of Missouri, have invented a new and useful Churn, of which the following is a specification.

This invention relates to churns, and has for its object to simplify and improve devices of this character and produce a device adapted for detachable connection to the cream-receiver and having means for adjustable connection to the dasher therein to adapt it to the quantity of the cream; and the invention consists in certain novel features of construction, as hereinafter shown and described, and specified in the claims.

Figure 1:
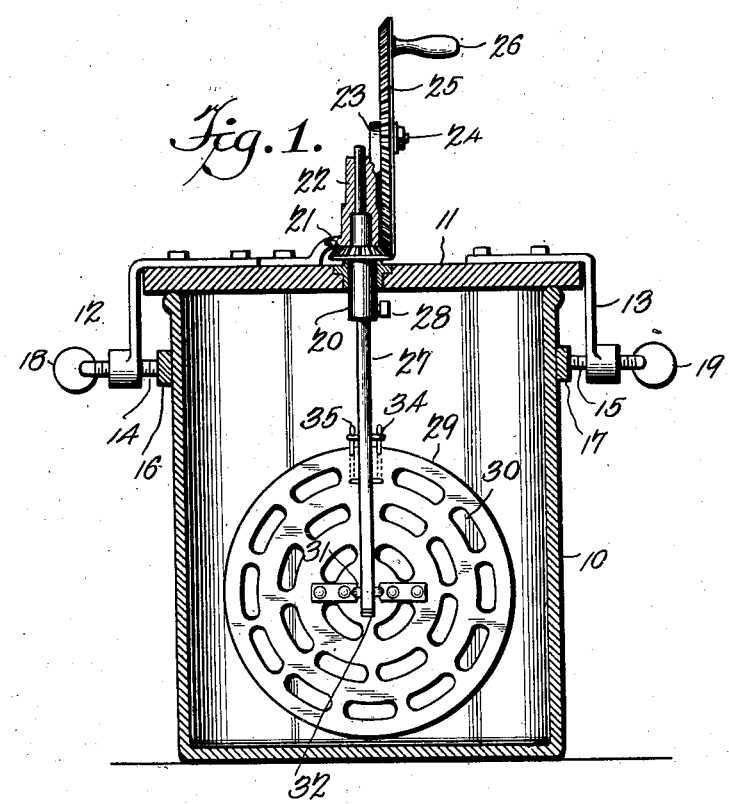
Figure 2:
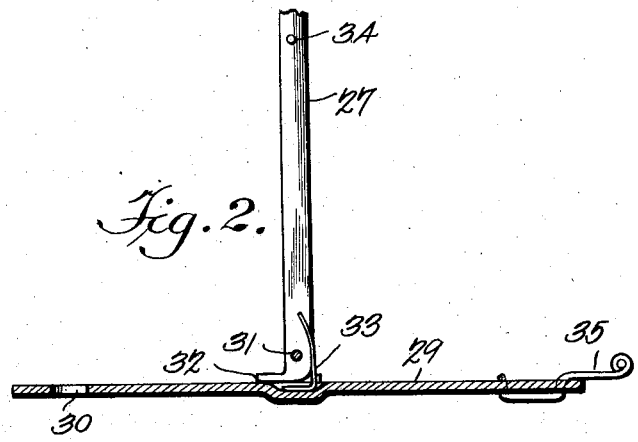

In the drawings illustrative of the invention, in which corresponding parts are denoted by like designating characters, Figure 1 is a vertical sectional elevation. Fig. 2 is a sectional detail of the dasher, illustrating its construction.

The improved device is intended more particularly to provide means whereby cream may be churned in any vessel in which a dasher may be introduced and operated, such as an ordinary crockeryware jar or crock, a pail or similar vessel, or in a cream-receptacle constructed especially for the reception of the dasher and its operating mechanism. The device may thus be manufactured in various sizes to adapt it to produce large or small quantities of butter, but for the purpose of illustration is shown applied to a receptacle 10 of ordinary form.

The improved device consists of a cover or base member 11, resting upon top of the receptacle and provided with depending oppositely-disposed hangers or brackets 12 13, having threaded rods 14 15 operating therethrough, the rods having shoes 16 17 upon their inner ends to engage the vessel 10 and with thumb-nuts 18 19 upon their outer ends. By this simple means it will be obvious the base member 10 may be firmly and detachably clamped to the receptacle, and by forming the screw-rods relatively long the device may be adapted to receptacles of various sizes.

Mounted for rotation centrally of the base member 11 and supported thereby is a tubular sleeve 20, having a gear-pinion 21 above the member 11. The sleeve is supported at its upper end by a bearing 22 from the member 11, the latter having an arm 23, carrying a stub-shaft 24, upon which a larger gear 25 is mounted in position to engage the pinion 21, the gear having an operating-handle 26, as shown. By this means it will be obvious that the rotation of the gear 25 by its handle 26 will correspondingly rotate the tubular shaft 20 and at an increased speed.

Extending through the tubular shaft 20 is a stem 27, adjustably secured therein, as by a set-screw 28, so that the stem partakes of the motion of the tubular shaft and is longitudinally adjustable therein.

The dasher is carried by the stem 27 and consists of a disk 29, having a plurality of spaced apertures 30 and provided with a centrally-disposed bearing 31, spaced from the face of the dasher and upon which the stem 27 is journaled near its lower end, the stem terminating in a laterally-extended foot 32, as shown. Attached to the side of the stem 27 opposite to the foot 32 is a spring 33, extending below the foot and engaging the adjacent face of the dasher. When the dasher is turned at right angles to the stem, as shown in Fig. 2, the foot portion 32 limits its movement and prevents it from moving beyond a right-angled line relative to the stem, while the spring 33, pressing against the dasher, maintains it yieldably in its right-angled position. Extending from opposite sides of the stem 27 are pins 34, with which spring-catches 35 engage when the dasher is turned into parallel relations to the stem, as shown in Fig. 1. The catches 35 and spring 33 will be of sufficient strength to support the dasher in either of its two positions against displacement while in use, but which will yield to force sufficiently to detach the dasher when its position is to be changed. By this simple arrangement when the cream is to be churned the dasher is set in its vertical position and the stem 27 adjusted by the set-screw 28 to adapt the dasher to the depth of the vessel 10 in which it is to operate or to the quantity of the cream to be churned. The member 11 and its attachments are then clamped to the rim of the vessel by the screws 14 15 and the dasher rotated, as above described. When the churning process is completed, the clamps are loosened and the member 11 elevated sufficiently to enable the set-screw 28 to be loosened. The member 11 and its attachments are then removed, leaving the stem 27 and dasher in the receptacle 10. The catches 35 are then loosened and the dasher permitted to assume a right-angled position to the stem, as shown in Fig. 2, and beneath the mass of butter. The dasher is thus placed in position out of the way of the butter, or it may be utilized as a means for removing the mass of butter and permitting it to be drained of the buttermilk.

The whole device may be of metal except the member 11, which may be of wood of suitable strength to withstand the strains to which it will be subjected.

By this simple means a churning attachment is provided which may be readily attached to any vessel and any quantity of cream churned. The device will be found especially useful for small families, who by this means may quickly manufacture their own butter as fast as required; but while the device is thus especially adapted for small churnings it may also be employed for larger churns, if required.

Having thus described the invention, what I claim is—

1. In a churn, a supporting-stem, a dasher movably connected with said stem, means for rotating said stem and its connected dasher, connecting elements carried by said dasher and stem respectively and adapted for detachable engagement to hold said dasher parallel to said stem, and means for supporting said dasher at right angles to said stem.

2. In a churn, a stem, a dasher movably connected with said stem, means for limiting the movement of said dasher in one direction, and a spring disposed to yieldably hold said dasher from movement in the other direction.

3. In a churn, a stem, a dasher movably connected with said stem, means for limiting the movement of said dasher in one direction, a spring disposed to yieldably hold said dasher from movement in the other direction, and means for yieldably connecting said stem with said dasher to hold said dasher in position parallel with the stem.

4. In a churn, a dasher having trunnions spaced therefrom, a stem having a transverse perforation engaging said trunnions and provided with a laterally-extended foot for limiting the movement of said dasher in one direction, a spring disposed to yieldably support said dasher from movement in the opposite direction, and means for yieldably coupling said stem to said dasher and maintain it yieldably in position parallel to said stem, substantially as described.

5. In a churn, a dasher, a stem movably connected by one end to said dasher and provided with laterally-extending pins, and spring-catches carried by said dasher and adapted to yieldably engage said pins and thereby couple the dasher parallel to the stem, substantially as described.

In testimony that I claim the foregoing as my own I have hereto affixed my signature in the presence of two witnesses.

BENJAMIN VESSELS.

Witnesses:
JOHN B. KLUMP,
JOHN MILES.